3,417,052
POLYETHERS AND PROCESS FOR THEIR MANUFACTURE

Gunter Messwarb, Kelkheim, Taunus, Walter Luders, Neu-Isenburg, and Johannes Munder and Hartmut Steppan, Wiesbaden, Germany, assignors to Farbwerke Hoechst Aktiengesellschaft vormals Meister Lucius & Bruning, Frankfurt am Main, Germany, a corporation of Germany
No Drawing. Filed Jan. 3, 1967, Ser. No. 606,540
Claims priority, application Germany, Jan. 7, 1966,
F 48,111
7 Claims. (Cl. 260—47)

It is an object of this invention to provide novel copolymers which, according to their chemical structure, belong to the class of polyethers and are capable to undergo reactions, for example cross-linking reactions and grafting reactions, under the action of luminous rays. It is another object of this invention to provide a process for the manufacture of the said polyethers.

It is known to produce polyethers of high molecular weight from epoxide groups containing compounds by polymerizing them in the presence of special catalysts.

Polymers of this type, for example polyethylene oxide, polypropylene oxide, polyepichlorohydrin, or copolymers of ethylene oxide, propylene oxide, epichlorohydrin, glycidyl compounds and other monomers containing epoxide groups have gained industrial interest.

Polyethylene oxide of high molecular weight can be used, for example, for the manufacture of films or as binder in the preparation of coating compositions. Polypropylene oxide and polyepichlorohydrin have been recommended as rubber-like materials.

It is also known to improve to a greater or lesser extent the mechanical properties of thermoplastic and elastomeric polymers by subsequent cross-linking (vulcanization).

It has been proposed to subject unsaturated polyethers, for example copolymers of propylene oxide and allyl glycidyl ether, to the known vulcanization with sulfur. Other cross-linking reactions known to the expert for products of the polyether type are the reaction with peroxides or the treatment of chlorine-containing polymers with polyamines.

Cross-linking reactions as specified above put considerable chemical and thermal strain on the polymers to be cross-linked. Consequently, discolorations of the products, disagreeable odor and partial chain cleavage must be taken into account, especially in the presence of aggressive cross-linking auxiliaries.

The present invention provides a process for the manufacture of polyethers which comprises copolymerizing compounds of Formula I $$CH_2\text{—}CH\text{—}R_1$$
$$\diagdown O \diagup$$

in which $R_1$ stands for hydrogen, alkyl, aryl, halogenoalkyl or —$CH_2OR_2$, $R_2$ being alkyl, allyl, aryl or vinyl, with compounds of Formula II $$CH_2\text{—}CH\text{—}CH_2\text{—}OX$$
$$\diagdown O \diagup$$

in which X stands for a radical of one of the formulae

[structure: phenyl(R')—C(=O)—(CH=CH)_y—phenyl(R')]

[structure: phenyl(R')—C(=O)—CH=CH—naphthyl]

[structure: —C(=O)—CH=CH—phenyl(R')]

[structure: phenyl—CH=CH—C(=O)—O—R'']

[structure: phenyl—CH=CH—C(=O)—N(R''')(R''')]

in which formulae

R' represents hydrogen, alkyl, alkoxy, or halogen and may occur several times and alkyl and alkoxy may form a ring;
R'' represents alkyl or aryl;
R''' represents alkyl and
y stands for a whole number in the range of from 1 to 4,
and compounds of Formula III $$CH_2\text{—}CH\text{—}CH_2\text{—}O\text{—}\underset{R_3}{\text{phenyl}}\text{—}\underset{O}{\overset{\|}{C}}\text{—}R_4$$
$$\diagdown O \diagup$$

in which $R_3$ represents hydrogen, alkyl, alkoxy or halogen and
$R_4$ represents alkyl, phenyl, alkylaryl, alkoxyaryl, or halogenoaryl, in the presence of ionic catalysts which, under the polymerization conditions, cause an opening of oxirane rings.

More particularly, in the compounds of Formula I used in the copolymerization $R_1$ has the following meaning: hydrogen; alkyl, preferably methyl and ethyl; aryl, preferably phenyl, ethylphenyl and halogenophenyl, the halogen being fluorine, chlorine, bromine or iodine; halogenoalkyl, preferably —$(CH_2)_nCl$ or —$(CH_2)_nF$ in which $n$ stands for 1 or 2, —$CHCl_2$, —$CHF_2$, —$(CH_2)_mCCl_3$, —$(CH_2)_mCF_3$ in which $m$ is zero or 1, —$CHCl$—$CH_2Cl$,

—$CHF$—$CH_2F$; —$CH_2$—$OR_2$ in which $R_2$ stands for alkyl with 1 to 5 carbon atoms, allyl, vinyl or aryl, preferably phenyl, or alkylphenyl, the alkyl having 1 to 5 carbon atoms;

in the compounds of Formula II

R' stands for hydrogen; alkyl with 1 to 5 carbon atoms, alkoxy with 1 to 5 carbon atoms, or fluorine, chlorine, bromine or iodine;
R'' stands for alkyl with 1 to 5 carbon atoms, aryl, preferably phenyl or alkyl phenyl in which the alkyl group has 1 to 5 carbon atoms;
R''' stands for alkyl with 1 to 5 carbon atoms;

in the compounds of Formula III $R_3$ is hydrogen, alkyl, preferably methyl or ethyl; alkoxy, preferably methoxy or ethoxy; halogen, preferably chlorine or bromine;

R₄ is alkyl with 1 to 5 carbon atoms, phenyl, alkylaryl in which the alkyl group has 1 to 5 carbon atoms; alkoxyaryl in which the alkoxy group has 1 to 5 carbon atoms; halogenaryl in which the halogen is fluorine, chlorine, bromine or iodine.

The polyethers prepared by the process according to the invention can be further reacted, for instance cross-linked, for example in the form of films, coatings or shaped articles, in the presence of free radicals under the action of light of a wave length of 2000 to 7000 A., if desired with the addition of usual additives.

A special advantage resides in the fact that the polyethers can be cross-linked under very mild conditions within a short period of time in the absence of the common, aggressive cross-linking agents. The mechanical properties of sheet-like structures from polyethers are thus improved and their surface is cured.

This mode of operation permits to modify in a predetermined manner the surfaces of polyether structures. A cross-linking reaction considerably improves, for example, the stability of polyether films towards solvents, while a grafting reaction to the polyethers according to the invention in the presence of monomers polymerizable under the action of free radical polymerization catalysts chemically modifies the polymer in a manner often desired for industrial purposes.

It is known to add light sensitizers of low molecular weight to polymers to bring about cross-linking under the ultraviolet light. Ketones such as acetone, acetophenone and benzophenone have been proposed for this purpose. Moreover, attempts have been made to render polymers of polar vinyl monomers reactive towards light radiation by copolymerization in the presence of free radicals with light-sensitive acrylic acid or methacrylic acid esters.

It is known to produce light-sensitive vinyl polymers by copolymerization in the presence of free radicals of vinyl monomers with unsaturated compounds carrying cinnamic acid groups or chalcone groups. Owing to the presence of two double bonds in the monomer, the free copolymerization furnishes insoluble, i.e. cross-linked products.

As component I for the polyethers produced according to the invention there can be used, for example, alkylene oxides such as ethylene oxide, propylene oxide, butylene oxide; substituted alkylene oxides such as epichlorohydrin, epibromohydrin, 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2-,3-epoxypropane, 1,1,1-trichloro-3,4-epoxybutane; epoxy ethers, such as methylglycidyl ether, isobutylglycidyl ether, tert. butyl-glycidyl ether, n-hexylglycidyl ether, n-octylglycidyl ether, phenylglycidyl ether, chlorophenylglycidyl ether, alkylphenylglycidyl ethers, chloroalkylphenylglycidyl ethers; or unsaturated glycidyl ethers such as vinylglycidyl ether, allylglycidyl ether; as well as other epoxides such as styrene oxide or butadiene monoepoxide. In the process according to the invention ethylene oxide, propyleneoxide, epichlorohydrin and styrene oxide are preferably used.

As light-sensitive component II the following compounds are preferably used:

It is of special advantage to use as component II piperonalacetophenone - (4) - glycidyl ether, cinnamic acid glycidyl ester and cinnamalacetophenone - (4) - glycidyl ether.

As acetophenone and benzophenone derivatives (component III) the following compounds are preferably used in the copolymerization according to the invention:

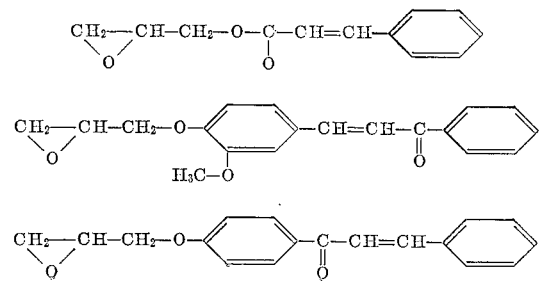

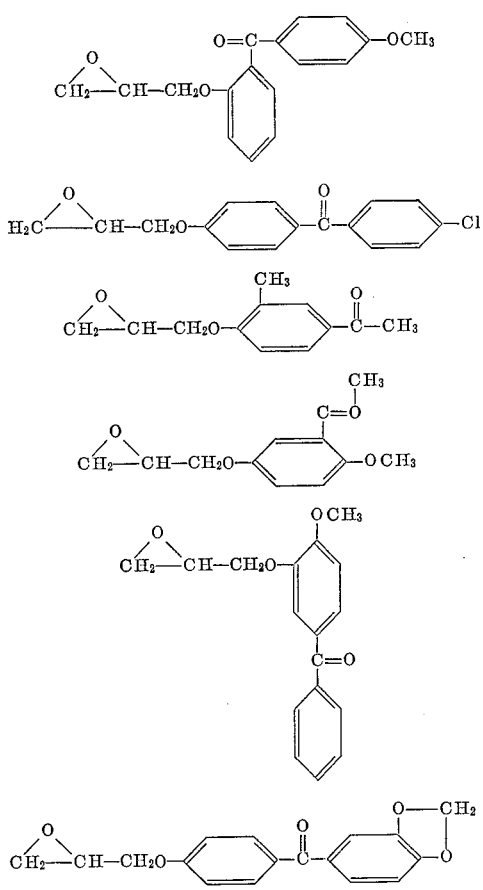

The 4 - benzoylphenyl - glycidyl ether is especially suitable as component III.

In the polyethers according to the invention the two light-sensitive components shall be incorporated together in an amount of at least 0.01 mol percent, preferably more than 0.1 mol percent, calculated on the copolymer. Copolymers containing, incorporated therewith, 0.1–10 mol percent, calculated on the copolymer, of components II and III have especially interesting properties. In principle, higher proportions may also be incorporated, but, in general, higher proportions of components II and III will not be used for economical considerations as they do not involve a noticeable advantage justifying the higher amounts of these monomers.

The light-sensitive glycidyl compounds II and III can be incorporated into the polyether chain either statistically or in blocks or they can be bound to the terminal groups. It is immaterial in the process of the invention whether the light-sensitized polyethers are amorphous, crystalline, with or without steric arrangement.

In the polymerization according to the invention ionic catalyst systems are used which cause oxirane rings to open under the polymerization conditions. Suitable catalysts are, for example, alkali metal and alkaline earth metal hydroxides, calcium amide, zinc carbonate, ferric chloride, ferric alkoxides, ferric salts, $SbCl_5$, $SnCl_4$, $BF_3$ or $BF_3$-etherate. Preferred catalysts are organic compounds of the metals aluminum, zinc and magnesium of the general formula

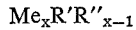

in which Me represents a metal having the valence $x$, R' stands for alkyl, preferably methyl or ethyl; R" is hydrogen, alkyl, preferably methyl or ethyl, methoxy, ethoxy or hydroxy.

The catalysts are prepared in known manner from the metal alkyls with the addition of defined small amounts of water and complex-forming agents.

The copolymerization according to the invention is carried out at a temperature in the range of from 20 to 100° C., advantageously 30 to 80° C.

Suitable solvents for carrying out the polymerization are, for example, aliphatic and aromatic hydrocarbons, preferably petroleum hydrocarbons boiling at a temperature in the range of from 50 to 150° C., benzene, toluene, chlorohydrocarbons, preferably carbon tetrachloride, and occasionally ether.

The copolymerization according to the invention is advantageously carried out with the exclusion of oxygen, for example in a nitrogen atmosphere. It is absolutely necessary to exclude moisture to as far an extent as possible.

It has proved advantageous to eliminate the action of day-light and lighting during polymerization and working up of the polymeric products.

Films, sheetings, coatings and shaped articles are made from the polyethers, which are generally obtained in solution, according to known methods. It is obvious that in this stage of the process light must be eliminated to as far an extent as possible.

In solution cross-linking takes place much more slowly than in the solid phase. It is therefore also possible, in principle, to polymerize and work up the polymer under diffused light or ruby light.

The reaction initiated by light of the poly-ethers according to the invention, such as cross-linking or grafting reactions, can be induced either by the action of sunlight or by suitable artificial sources of light.

The copolymers produced by the process of the invention can be used as coating masses for textiles, sheetings and shaped articles.

In order to obtain an optimum cross-linking effect it is expedient to remove residual solvents and other disturbing impurities by an appropriate conditioning of the polyether layers to be irradiated. Experiments have shown that it is favorable to condense the material before it is exposed to radiation, for example on a calender or by compression.

The monomers polymerizable under the action of free radical catalysts are grafted on to the polyethers according to the invention by methods described in literature. Vinyl compounds are preferably used that are especially suitable for grafting reactions such as acrylonitrile, acrylic acid, 2-vinylpyridine, vinyl chloride, styrene, vinyl acetate, vinyl formate, esters of acrylic or methacrylic acid and monovalent saturated aliphatic alcohols with 1–10 carbon atoms, and more preferably styrene, acrylonitrile and vinyl chloride.

The following examples serve to illustrate the invention but they are not intended to limit it thereto, the parts and percentages being by weight unless otherwise stated.

EXAMPLE 1

In a polymerization vessel protected against the radiation of light a mixture of 9.75 parts of ethylene oxide, 0.25 part of piperonalacetophenone-(4)-glycidyl ether and 0.25 part of 4-benzoylphenylglycidyl ether was dropped while stirring in a nitrogen atmosphere over a period of 1 hour at 60° C. into 100 parts of toluene and 6.15 parts of a catalyst solution consisting of 4.12 parts of aluminumtriethyl dissolved in 11.23 parts of n-heptane and 6.94 parts of diethyl ether, 0.31 part of water and 1.76 parts of acetylacetone. The mixture was stirred for 7 hours at 60° C. whereupon the polymerization was interrupted by adding 2 parts of ethanol. The solution was concentrated by evaporation at 50° C. under reduced pressure. The yield amounted to 78%.

A film having a thickness of 0.1 mm. was made from a benzenic solution of the copolymer and exposed to the radiation of a combined mercury vapor and incandescent lamp (Philips MLL 160 W) at a distance of 18 cm. for 10 minutes.

After said treatment the film was insoluble in benzene whereas a polyethylene oxide film prepared and treated in the same manner was soluble in benzene.

EXAMPLE 2

In a polymerization vessel protected against the action of light a mixture of 100 parts of toluene, 9.5 parts of ethylene oxide, 0.25 part of 4-benzoylphenylglycidyl ether, 0.25 part of cinnamic acid glycidyl ester and 6.15 parts of a catalyst solution consisting of 4.12 parts of aluminum triethyl dissolved in 11.23 parts of n-heptane and 6.94 parts of diethyl ether, 0.31 part of water and 1.76 parts of acetylacetone was stirred for 7 hours at 60° C. in a nitrogen atmosphere. The polymerization was interrupted by adding 2 parts of ethanol and the solution was concentrated by evaporation at 50° C. under reduced pressure. The yield amounted to 55%.

From the benzenic solution of the copolymer a film was made having a thickness of 0.1 mm. and exposed to the radiation of ultraviolet rays (mercury maximum pressure burner Q 81, capacity 70 w., Original Hanau (registered Trademark)) at a distance of 10 cm. for 5 minutes.

After said treatment the film was insoluble in benzene in contradistinction to a film of polyethylene oxide prepared and treated in analogous manner.

EXAMPLE 3

In a polymerization vessel protected against the action of light a mixture of 9.5 parts of ethylene oxide, 0.25 part of 4-benzoylphenylglycidyl ether and 0.25 part of cinnamalacetophenone-(4)-glycidyl ether was dropped over a period of 1 hour in a nitrogen atmosphere into 100 parts of toluene and 6.15 parts of a catalyst solution consisting of 4.12 parts of aluminum-triethyl dissolved in 11.23 parts of n-heptane and 6.94 parts of diethyl ether, 0.31 part of water and 1.76 parts of acetylacetone. The mixture was stirred for 7 hours at 60° C. whereupon the polymerization was interrupted by adding 2 parts of ethanol. The solution was concentrated by evaporation at 50° C. under reduced pressure. The yield amounted to 80%.

From the benzenic solution of the copolymer a film having a thickness of 0.1 mm. was made and exposed to the radiation of a combined mercury vapor and incandescent lamp (Philips MLL 160 W) at a distance of 18 cm. for 5 minutes.

After said treatment the film was insoluble in benzene in contradistinction to a polyethylene oxide film prepared and treated in analogous manner.

EXAMPLE 4

In a polymerization vessel protected against the action of light a mixture of 9.6 parts of ethylene oxide, 0.2 part of 2-acetylphenylglycidyl ether and 0.2 part of phenylheptatrienalacetophenoneglycidyl ether-4 was dropped over a period of 1 hour under a nitrogen atmosphere into 100 parts of benzene, and 6.15 parts of a catalyst solution consisting of 4.12 parts of aluminumtriethyl dissolved in 11.23 parts of n-heptane and 6.94 parts of diethyl ether, 0.31 part of water and 1.76 parts of acetylacetone. The mixture was stirred for 7 hours at 60° C. whereupon the polymerization was interrupted by adding 2 parts of ethanol. The solution was concentrated by evaportation at 50° C. under reduced pressure. The yield amounted to 75%.

From a benzenic solution of the copolymer a film was made having a thickness of 0.1 mm. and exposed to the radiation of ultraviolet rays (mercury maximum pressure burner Q 81, capacity 70 w., Original Hanau) at a distance of 10 cm. for 5 minutes.

After said treatment the film was insoluble in benzene in contradistinction to a polyethylene oxide film prepared and treated in analogous manner.

EXAMPLE 5

A polymerization vessel protected against the action of light was charged in a nitrogen atmosphere with 100 parts of toluene and 6.15 parts of a catalyst solution consisting of 4.12 parts of aluminumtriethyl, dissolved in 11.23 parts of n-heptane and 6.94 parts of diethyl ether, 0.31 part of water and 1.76 parts of acetylacetone. The contents of the vessel were heated at 60° C. and while stirring a mixture of 9.5 parts of ethylene oxide, 0.25 part of 4-benzoylphenylglycidyl ether, 0.25 part of 4-acetylphenylglycidyl ether and 0.5 part of cinnamic acid glycidyl ester was dropped in over a period of 1 hour. The mixture was stirred for 7 hours at 60° C. whereupon the polymerization was interrupted by adding 2 parts of ethanol. The solution was concentrated by evaporation at 50° C. under reduced pressure. The yield amounted to 60%.

From a benzenic solution of the copolymer a film was made having a thickness of 0.1 mm. and exposed to the radiation of a combined mercury vapor and incandescent lamp (Philips MLL 160 W) at a distance of 18 cm. for 5 minutes.

After said treatment the film was insoluble in benzene in contradistinction to a polyethylene oxide film prepared and treated in analogous manner.

What is claimed is:

1. A process for the manufacture of polyethers wherein
(a) compounds of Formula I

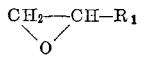

in which $R_1$ stands for hydrogen, methyl, ethyl, phenyl, ethylphenyl, halogenophenyl, $-(CH_2)_nCl$ or $-(CH_2)_nF$, $n$ being 1 or 2, $-CHCl_2$, $-CHF_2$, $-(CH_2)_mCCl_3$ or $-(CH_2)_mCF_3$, $m$ being zero or 1, $-CHCl-CH_2Cl$, $-CHF-CH_2F$, or $-CH_2-OR_2$, $R_2$ being alkyl with 1 to 5 carbon atoms, allyl, vinyl, phenyl or alkylphenyl in which the alkyl group has 1 to 5 carbon atoms, are copolymerized with the substantial exclusion of light, under an inert atmosphere, under anhydrous conditions in the presence of ionic catalysts which, under the polymerization conditions, bring about an opening of oxirane rings, with (b) compounds of Formula II $$CH_2-CH-CH_2-OX$$
$$\diagdown O \diagup$$

in which X stands for a radical of one of the following formulae

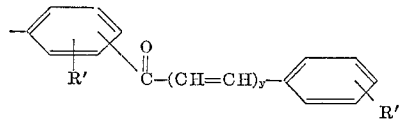

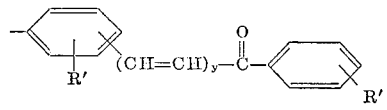

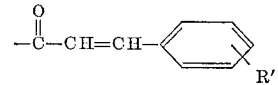

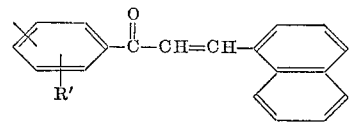

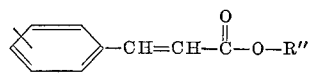

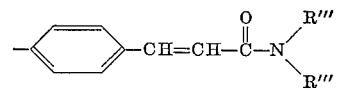

in which formulae

R' represents hydrogen, alkyl with 1 to 5 carbon atoms, alkoxy with 1 to 5 carbon atoms or halogen and may occur several times and the alkyl and alkoxy radicals may be members of a 5 membered ring, R'' represents alkyl with 1 to 5 carbon atoms, phenyl or or alkylphenyl in which the alkyl group has 1 to 5 carbon atoms, R''' represents alkyl with 1 to 5 carbon atoms and y is a whole number in the range of from 1 to 4, and, (c) compounds of formula III

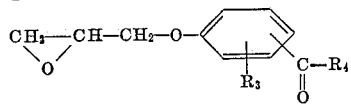

in which

R$_3$ stands for hydrogen, methyl, ethyl, methoxy, ethoxy, chlorine or bromine and R$_4$ stands for alkyl with 1 to 5 carbon atoms, phenyl, alkylphenyl in which the alkyl group has 1 to 5 carbon atoms, alkoxyphenyl in which the alkoxy group has 1 to 5 carbon atoms, or halogenophenyl.

2. The process of claim 1, wherein components II and III are used in an amount of 0.1–10 mol percent, calculated on the copolymer.

3. The process of claim 1, wherein ethylene oxide is used as component I.

4. The process of claim 1, wherein propylene oxide is used as component I.

5. The process of claim 1, wherein component II is piperonalacetophenone-(4)-glycidyl ether, cinnamic acid glycidyl ester, cinnamalacetophenone-(4) - glycidyl ether or phenylheptatrienal-acetophenone-(4)-glycidyl ether.

6. The process of claim 1, wherein component III is 4-benzoylphenyl-glycidyl ether or 2-acetylphenyl-glycidyl ether.

7. Copolymers from (a) compounds of Formula I

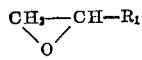

in which

R$_1$ stands for hydrogen, methyl, ethyl, phenyl, ethylphenyl, halogenophenyl, —(CH$_2$)$_n$Cl or —(CH$_2$)$_n$F, n being 1 or 2, —CHCl$_2$, —CHF$_2$, —(CH$_2$)$_m$CCl$_3$ or —(CH$_2$)$_m$CF$_3$, m being zero or 1, —CHCl—CH$_2$Cl, —CHF—CH$_2$F, or —CH$_2$—OR$_2$, R$_2$ being alkyl with 1 to 5 carbon atoms, allyl, vinyl, phenyl or alkylphenyl in which the alkyl group has 1 to 5 carbon atoms, (b) compounds of Formula II

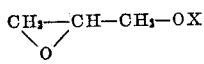

in which X stands for a radical of one of the following formulae

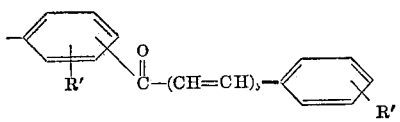

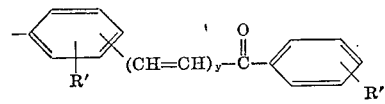

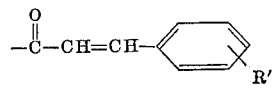

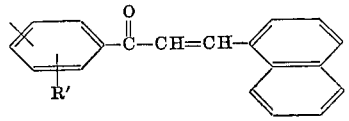

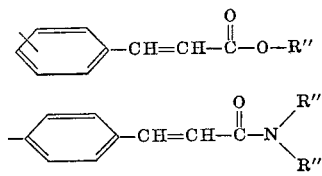

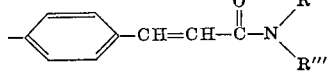

in which formulae

R' represents hydrogen, alkyl with 1 to 5 carbon atoms, alkoxy with 1 to 5 carbon atoms or halogen and may occur several times and the alkyl and alkoxy radicals may be members of a 5 membered ring, R'' represents alkyl with 1 to 5 carbon atoms, phenyl or or alkylphenyl in which the alkyl group has 1 to 5 carbon atoms, R''' represents alkyl with 1 to 5 carbon atoms and y is a whole number in the range of from 1 to 4, and, (c) compounds of formula III

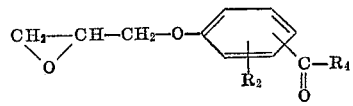

in which

R$_3$ stands for hydrogen, methyl, ethyl, methoxy, ethoxy, chlorine or bromine and R$_4$ stands for alkyl with 1 to 5 carbon atoms, phenyl, alkylphenyl in which the alkyl group has 1 to 5 carbon atoms, alkoxyphenyl in which the alkoxy group has 1 to 5 carbon atoms, or halogenophenyl.

References Cited

UNITED STATES PATENTS 3,135,705   6/1964   Vandenberg _____ 260—2
3,200,086   8/1965   Coleman _____ 260—63

WILLIAM H. SHORT, *Primary Examiner.*

T. D. KERWIN, *Assistant Examiner.*

U.S. Cl. X.R.

260—2, 33.63, 78.3, 88.3, 240, 348, 830, 836; 117—161; 96—115